United States Patent
Ibi et al.

(10) Patent No.: US 9,166,261 B2
(45) Date of Patent: Oct. 20, 2015

(54) METHOD FOR REUSING SECONDARY BATTERY

(75) Inventors: Yuuichi Ibi, Toyohashi (JP); Kunio Kanamaru, Okazaki (JP); Masahiro Iwamoto, Toyota (JP); Yasushi Matsukawa, Toyohashi (JP); Atsushi Ootaguro, Hamamatsu (JP)

(73) Assignee: Primearth EV Energy Co., Ltd., Kosal-shi (JP)

( * ) Notice: Subject to any disclaimer, the term of this patent is extended or adjusted under 35 U.S.C. 154(b) by 832 days.

(21) Appl. No.: 13/074,706

(22) Filed: Mar. 29, 2011

(65) Prior Publication Data
US 2011/0239445 A1 Oct. 6, 2011

(30) Foreign Application Priority Data

Mar. 31, 2010 (JP) .................................. 2010-83412
Mar. 31, 2010 (JP) .................................. 2010-83413

(51) Int. Cl.
- *H01M 10/04* (2006.01)
- *H01M 10/54* (2006.01)
- *H01M 2/10* (2006.01)
- *H01M 6/42* (2006.01)

(52) U.S. Cl.
CPC ............ *H01M 10/54* (2013.01); *H01M 2/1077* (2013.01); *H01M 6/42* (2013.01); *Y02W 30/84* (2015.05); *Y10T 29/49108* (2015.01)

(58) Field of Classification Search
CPC ..... H01M 10/54; H01M 2/1077; H01M 6/52; H01M 6/42; Y10T 29/49108

USPC ...................... 429/156, 90, 123, 49; 29/623.1
See application file for complete search history.

(56) References Cited

U.S. PATENT DOCUMENTS

2003/0008201 A1   1/2003   Komori
2003/0224241 A1*  12/2003  Takada et al. ................... 429/52
(Continued)

FOREIGN PATENT DOCUMENTS

JP     2003-17142 A    1/2003
JP     2004-328902 A   11/2004
(Continued)

OTHER PUBLICATIONS

Japanese Notice of Grounds for Rejection mailed Jan. 7, 2014, issued in corresponding Japanese Application No. 2010-083413, filed Mar. 3, 2010, 5 pages.

*Primary Examiner* — Carlos Barcena
(74) *Attorney, Agent, or Firm* — Christensen O'Connor Johnson Kindness PLLC

(57) ABSTRACT

A method for reusing a secondary battery by reusing unit cells or battery modules constituting reclaimed assembled batteries (or battery packs) to reconstruct a new assembled battery is disclosed. Assembled batteries are reclaimed, and disassembled into battery modules. The battery modules are selected based on battery characteristics such as an open-circuit voltage (OCV) and the like using an absolute acceptable range and a relative acceptable range, and a new assembled battery is rebuilt. The relative acceptable range is an acceptable range which is set for each assembled battery, and is set to have its center at an average value of a battery characteristic distribution.

6 Claims, 7 Drawing Sheets

(56) References Cited

U.S. PATENT DOCUMENTS

| | | |
|---|---|---|
| 2007/0108946 A1 | 5/2007 | Yamauchi |
| 2009/0011327 A1* | 1/2009 | Okumura et al. ............... 429/99 |
| 2009/0013521 A1* | 1/2009 | Okumura et al. ............... 29/730 |
| 2009/0284226 A1 | 11/2009 | Komori |
| 2010/0040939 A1* | 2/2010 | Maegawa et al. ............... 429/49 |
| 2010/0047684 A1 | 2/2010 | Okumura |
| 2011/0300416 A1* | 12/2011 | Bertness ......................... 429/49 |
| 2013/0015702 A1* | 1/2013 | Ito .................................. 307/9.1 |

FOREIGN PATENT DOCUMENTS

| | | |
|---|---|---|
| JP | 2007-141464 A | 6/2007 |
| JP | 2008-293703 A | 12/2008 |
| JP | 2009-277627 A | 11/2009 |

* cited by examiner

METHOD FOR REUSING SECONDARY BATTERY

PRIORITY INFORMATION

This application claims priority to Japanese Patent Applications No. 2010-083412 filed on Mar. 31, 2010 and No. 2010-083413 filed on Mar. 31, 2010, which are incorporated herein by reference in their entirety.

BACKGROUND

1. Technical Field

The present invention relates to a method for reusing a secondary battery, and more particularly to a method for combining secondary batteries reclaimed from users to reconstruct a newly assembled battery or battery pack.

2. Related Art

Assembled batteries each composed of a plurality of secondary batteries are used as power sources for electric vehicles, hybrid electric vehicles, or the like. On the other hand, from the viewpoint of efficient utilization of resources, in connection with assembled batteries used as a power source for vehicles, reusing techniques or reconstructing (re-building) an assembled battery having performance sufficient for reuse from assembled batteries reclaimed from users to enable resupply of a battery to a user have also been considered. With respect to rebuilding, because battery characteristics, such as variations in voltage due to overcharge, overdischarge, or memory effect, vary among assembled batteries which have been used, there has been proposed a structure wherein secondary batteries which have particularly superior battery performance are selected for rebuilding from among a plurality of reclaimed secondary batteries.

Japanese Patent Publication No. JP 2003-17142 A discloses a method for reusing a battery pack which houses a battery module in which a plurality of unit cells that are sealed-type nickel-metal hydride batteries are combined, the method comprising reclaiming a battery pack as a battery to be replaced when it is determined that the battery pack has reached its end of life, renewing unit cells or battery modules for which an end-of-life determination has been made by refilling them with an electrolytic solution, and reassembling them into a battery pack. An end-of-life determination is made when an internal resistance calculated for each unit cell or each battery module becomes greater than a specified value, or based on whether or not a variation in remaining capacity or voltage between unit cells or between battery modules becomes greater than a specified value.

Further, Japanese Patent Publication No. JP 2007-141464 A discloses a method for reusing a secondary battery module of a secondary battery system which includes one or more secondary battery modules, the method comprising the steps of obtaining, from the secondary battery system, at least one or more pieces of battery information selected from a resistance, a capacity, a battery use time, a resistance change rate, a capacity change rate, and a battery use intensity of a secondary battery module constituting the secondary battery; determining whether or not an obtained piece of battery information has reached a threshold value which is preset for that piece of battery information; reclaiming the secondary battery module when it is determined that the threshold value has been reached; grading the reclaimed secondary battery module in accordance with performance of the battery determined based on the battery information of the reclaimed secondary battery module; and, based on a result of the grading, applying the reclaimed secondary battery module to a system having threshold value conditions under which it can operate at the performance of the battery that the secondary battery module has at the time when it is being reclaimed.

Further, Japanese Patent Publication No. JP 2009-277627 A discloses carrying out reconstruction to create a newly assembled battery by combining reusable secondary batteries of an originally recycled battery or another battery that is stored in a fully discharged state, or by combining the secondary battery to be reused and a new secondary battery.

In cases where a newly assembled battery (or battery pack) or secondary battery system is reconstructed (rebuilt) by comparing an internal resistance or a capacity of unit cells or battery modules with a preset threshold value to determine whether or not an end of life has been reached, reclaiming the unit cells or battery modules, and grading them, although the internal resistance or the capacity value of the unit cells or battery modules constituting the rebuilt battery pack satisfies a reference value when it is rebuilt, there are relatively large overall variations when it is rebuilt, and the variations may further increase as the rebuilt assembled battery is used. For example, assume a case where there are two assembled batteries A and B for which it is determined that an end of life has been reached, and battery modules are taken from these two assembled batteries to rebuild a new assembled battery C. When the new assembled battery C is rebuilt by respectively grading a plurality of battery modules constituting the assembled battery A, respectively grading a plurality of battery modules constituting the assembled battery B, and putting together battery modules having a predetermined grade from the assembled battery A and battery modules having the same grade from the assembled battery B, because there are variations in, for example, internal resistance or voltage even among those having the predetermined grade of the assembled battery A, and there are variations in, for example, internal resistance or voltage even among those having the same grade of the assembled battery B, a range of variations in battery characteristics of the battery modules of the newly rebuilt assembled battery C is relatively large. When attention is focused on the assembled battery A, although, even if there is no problem in battery characteristics themselves such as internal resistance or voltage, it is more preferable not to incorporate battery modules having battery characteristics significantly deviated from battery characteristics of other battery modules included in the assembled battery A into the assembled battery C which is to be newly rebuilt, in conventional methods, such battery modules will be incorporated because there is no problem in battery characteristics themselves. This similarly applies to the assembled battery B.

SUMMARY

The present invention provides a method in which, when secondary batteries of unit cells or battery modules constituting reclaimed assembled batteries (or battery packs) are reused to reconstruct a new assembled battery, it is possible to select only the most suitable unit cells or battery modules to reconstruct an assembled battery having superior quality.

Further, the present invention provides a method in which, when a new assembled battery is reconstructed, the rate of reuse of unit cells or battery modules is improved, and battery characteristics of a rebuilt assembled battery can be made uniform.

According to one aspect of the present invention, there is provided a method for reusing a secondary battery by reconstructing an assembled battery from a plurality of used battery modules or unit cells, the method comprising a measurement step of measuring battery characteristics of a plurality of used battery modules or unit cells obtained by disassembling a plurality of used assembled batteries; a selection step of selecting battery modules or unit cells based on the battery characteristics measured in the measurement step, wherein an absolute acceptable range which is independent of the plurality of used assembled batteries, and a relative acceptable range which is set for each of the plurality of used assembled batteries, are used to select battery modules or unit cells falling within the absolute acceptable range, and falling within the relative acceptable range; and an assembly step of reconstructing a new assembled battery using the battery modules or unit cells selected in the selection step.

According to one embodiment of the present invention, the relative acceptable range is set for each of the used assembled batteries to be a predetermined range having a center at an average value of the battery characteristics for each of the used assembled batteries.

Further, according to another embodiment of the present invention, the relative acceptable range is set for each of the used assembled batteries using an average value and a standard deviation of the battery characteristics for each of the used assembled batteries.

Further, according to another embodiment of the present invention, the plurality of used assembled batteries are first-generation assembled batteries which were originally sold, or the plurality of used assembled batteries are second-generation assembled batteries reconstructed from a plurality of first-generation assembled batteries which were originally sold.

When the plurality of used assembled batteries are second-generation assembled batteries reconstructed from a plurality of first-generation assembled batteries which were originally sold, the relative acceptable range may be set for each of the second-generation used assembled batteries using an average value for a dominant distribution of the battery characteristics for each of the used assembled batteries. Alternatively, the relative acceptable range may be set for each of the second-generation used assembled batteries using an average value for all distributions of the battery characteristics for each of the used assembled batteries.

Further, according to another embodiment of the present invention, the above-described assembly step comprises reconstructing a new assembled battery using the battery modules or unit cells selected in the above-described selection step in a manner such that ratios of numbers of battery modules or unit cells of different original assembled batteries become the same for each battery block serving as a unit of detection in which battery characteristics of the newly reconstructed assembled battery are detected.

Further, according to another aspect of the present invention, there is provided a method for reusing a secondary battery by reconstructing an assembled battery from a plurality of used battery modules or unit cells, the method comprising a measurement step of measuring battery characteristics of a plurality of used battery modules or unit cells obtained by disassembling a plurality of used assembled batteries; a selection step of selecting reusable battery modules or unit cells based on the battery characteristics measured in the measurement step; and a reconstruction step of reconstructing an assembled battery using the battery modules or unit cells selected in the selection step in a manner such that ratios of numbers of battery modules or unit cells of different original assembled batteries become the same for each battery block serving as a unit of detection in which battery characteristics of the newly reconstructed assembled battery are detected.

Further, according to still another aspect of the present invention, there is provided a method for reusing a secondary battery by reconstructing an assembled battery from a plurality of used battery modules or unit cells, the method comprising a measurement step of measuring battery characteristics of a plurality of used battery modules or unit cells obtained by disassembling a plurality of used assembled batteries; a selection step of selecting reusable battery modules or unit cells based on the battery characteristics measured in the measurement step; a ranking step of ranking the battery modules or unit cells selected in the selection step in accordance with the battery characteristics measured in the measurement step; and a reconstruction step of reconstructing an assembled battery using the battery modules or unit cells ranked in the ranking step in a manner such that ratios of numbers of battery modules or unit cells of different ranks become the same for each battery block serving as a unit of detection in which battery characteristics of the newly reconstructed assembled battery are detected.

By employing the present invention, when secondary batteries of battery modules or unit cells constituting reclaimed assembled batteries are reused to reconstruct a new assembled battery, it is possible to select only the most suitable battery modules or unit cells. Further, by employing the present invention, the rate of reuse of unit cells or battery modules is improved, and battery characteristics of a rebuilt assembled battery can be made uniform.

DETAILED DESCRIPTION

Figure 1:
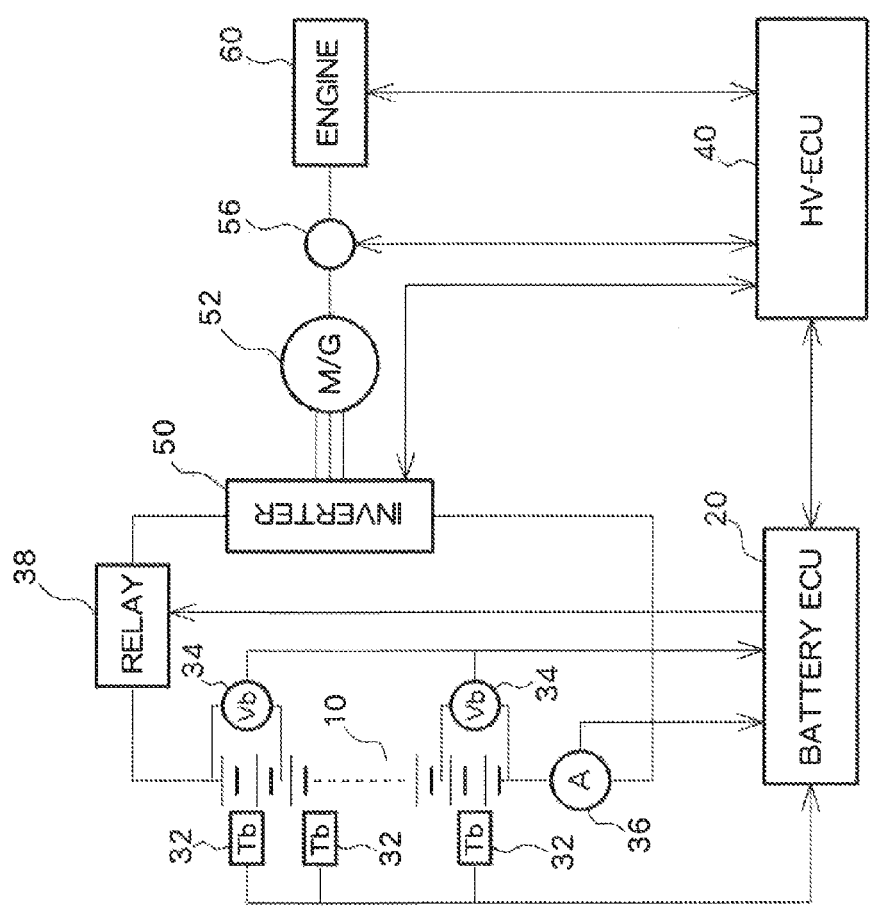
FIG. 1 is a block diagram showing a structure of a vehicle in which an assembled battery is mounted.

Embodiments of the present invention will be described below with reference to the drawings. It should be noted that these embodiments will be described merely by way of example, and the present invention is not limited to the following embodiments. Further, although the following embodiments will be described with reference to cases where rebuilding a new assembled battery (or battery pack) is performed in units of battery modules constituting an assembled battery (or battery pack), rebuilding may be performed in units of unit cells rather than battery modules.

1. Overview of Assembled Battery (or Battery Pack)

First, as a background for the following embodiments, an assembled battery to be mounted as a power source for an electric vehicle or a hybrid electric vehicle will be briefly described. Although the following description will be provided with reference to an assembled battery composed of rectangular secondary batteries (battery modules) having a flat rectangular parallelepiped shape, the present invention may also be applied to an assembled battery composed of cylindrical secondary batteries. Further, although the following description will be provided taking a nickel-metal hydride battery as an example, other types of secondary batteries, such as lithium batteries, may also be used.

An assembled battery is constructed by electrically connecting a plurality of secondary batteries in series in a state in which the secondary batteries are constrained by end plates provided at both ends. The secondary batteries are arranged in parallel with longitudinal sides being opposed to each other, and are electrically connected in series via connecting components. Each of the secondary batteries is, for example, a sealed-type nickel-metal hydride battery composed of an integrated battery container formed of a resin. A plurality of unit cells are connected in series within the integrated battery container to form a battery module. Each unit cell is, for example, a nickel-metal hydride battery, and when designed, or in other words, in an initial state, is often set such that the negative electrode has a capacitance greater than that of the positive electrode. The unit cell has a positive electrode containing nickel hydroxide as a positive electrode active material, and a negative electrode containing a hydrogen-absorbing alloy as a negative electrode active material, wherein the negative electrode has a charge reserve which is an excess capacity portion provided beforehand which is in an uncharged state when the positive electrode has been fully charged, and a discharge reserve which is an excess capacity portion provided beforehand which is in a charged state when the positive electrode has been fully discharged, and the negative electrode has a capacitance that is greater than a theoretical capacitance of the positive electrode.

When mounted in a vehicle, an assembled battery is monitored by a battery ECU. The battery ECU includes a processor, a ROM, and a RAM, and controls charging and discharging of the assembled battery and monitors the voltage, current, and temperature of the assembled battery to determine whether the assembled battery is normal or abnormal.

FIG. 1 is a block diagram showing a structure of a vehicle in which an assembled battery which is a secondary battery is mounted as a drive source. It should be noted that although FIG. 1 shows by way of example a hybrid electric vehicle as a vehicle in which an assembled battery is mounted, the present invention is not limited to this example, and may be applied to any type of vehicle having a motor as a drive source.

A battery control unit (battery ECU) 20 receives information such as battery voltage, battery temperature, and the like from an assembled battery 10 to estimate an SOC of the assembled battery 10 at predetermined control timing, and outputs information such as the estimated SOC, battery voltage, battery temperature, and the like to a hybrid vehicle control unit (HV-ECU) 40. The HV-ECU 40 controls an inverter 50, a driving force distribution mechanism 56, and an engine 60.

The assembled battery 10 is connected to a motor generator (M/G) 52 through a relay 38 and the inverter 50. The motor generator 52 is connected to the engine 60 through the driving force distribution mechanism 56 which includes a planetary gear mechanism.

Temperature sensors 32 are provided at predetermined locations of the assembled battery 10, and detect battery temperatures of the predetermined locations of the assembled battery 10.

Voltage detectors 34 are provided, one for each battery block, and detect terminal voltages of the respective battery blocks.

A current detector 36 detects a charging or discharging current flowing through the assembled battery 10.

Temperature data, terminal voltage data, and current data detected by the temperature sensors 32, the voltage detectors 34, and the current detector 36 are respectively supplied to the battery ECU 20 at predetermined sampling intervals. The battery ECU 20 estimates an SOC and an internal resistance of battery modules constituting the assembled battery 10 based on the temperature data, the terminal voltage data, and the current data supplied from the respective sensors.

It is known that although assembled batteries 10 are mounted in vehicles in this manner, the assembled batteries 10 have battery characteristics that are different from each other in accordance with their usage histories, and even among individual battery modules constituting an assembled battery, battery characteristics change in different manners as a result of individual differences among them. Therefore, in the process of rebuilding in which a new assembled battery is reconstructed by combining battery modules constituting a plurality of reclaimed assembled batteries, it is necessary to select battery modules having battery characteristics that are closely similar to each other.

2. Overview of Rebuilding

Next, an overview of rebuilding will be described.

As described above, in the process of rebuilding, it is necessary to select battery modules having battery characteristics that are closely similar to each other, and newly assemble an assembled battery using the selected battery modules. The battery characteristics to be used in the selection may include at least one or more of an open-circuit voltage (OCV), an internal resistance, a remaining capacity, a battery mass, a battery temperature, and the like. Assembled batteries which have been reclaimed are disassembled into battery modules, and individual battery modules are graded by measuring their battery characteristics. A new assembled battery is rebuilt by putting together battery modules having the same grade as each other. For example, assume that there are reclaimed assembled batteries A and B, the assembled battery A is composed of battery modules "a1" to "a20", and the assembled battery B is composed of battery modules "b1" to "b20". When it is assumed that battery modules having, for example, an OCV falling within an acceptable range defined by a lower limit value and an upper limit value in the assembled battery A are "a1" to "a12", and battery modules having an OCV falling within the same acceptable range in the assembled battery B are "b1" to "b6", a new assembled battery C is rebuilt by putting together these battery modules "a1" to "a12" and "b1" to "b6".

However, when attention is focused on the battery modules "a1" to "a12" of the assembled battery A, although all of these satisfy the OCV acceptable range, there are variations among the battery modules "a1" to "a12", and, for example, the battery modules "a1" and "a2" may have an OCV value significantly deviated from those of the remaining battery modules. It is not appropriate to reuse such battery modules as battery modules for constructing the new assembled battery C. In particular, as the battery modules "a1" to "a20" constituting the assembled battery A are in most cases manufactured in the same production lot, it is undesirable to use battery modules having an OCV significantly deviated from those of the other battery modules although the OCV itself falls within the acceptable range at the time when they are reclaimed in spite of the assumption that they should have almost the same battery characteristics as long as they are manufactured in the same production lot.

The above similarly applies to the battery modules constituting the assembled battery B, and in spite of the assumption that the battery modules "b1" to "b20" should have almost the same battery characteristics as long as they are manufactured in the same production lot, when there are battery modules having an OCV significantly deviated from those of the other battery modules although the OCV itself falls within the acceptable range at the time when they are reclaimed, such battery modules should not be reused for rebuilding the new assembled battery C.

With this being the situation, according to an embodiment of the present invention, in addition to selection of battery modules by determining whether or not battery characteristics such as an OCV, an internal resistance, a remaining capacity, a battery temperature and the like fall within an acceptable range, an acceptable range of variations for each reclaimed assembled battery is additionally provided, and battery modules falling outside the acceptable range of variations for each assembled battery are excluded from what are to be used in rebuilding even if the battery characteristics of such battery modules fall within the acceptable range. In other words, according to this embodiment, battery modules are selected with reference to two acceptable ranges, that is, an acceptable range of battery characteristics (hereinafter, referred to as "absolute acceptable range") and an acceptable range of variations for each assembled battery which has been reclaimed (hereinafter, referred to as "relative acceptable range"). Because battery modules constituting an assembled battery which was originally sold are in most cases battery modules manufactured in the same production lot, the relative acceptable range can be paraphrased as an acceptable range within the same production lot. However, it should be understood that the relative acceptable range can be applied even to an assembled battery composed of battery modules manufactured in different production lots.

3. Details of Rebuilding According to an Embodiment

Figure 2:
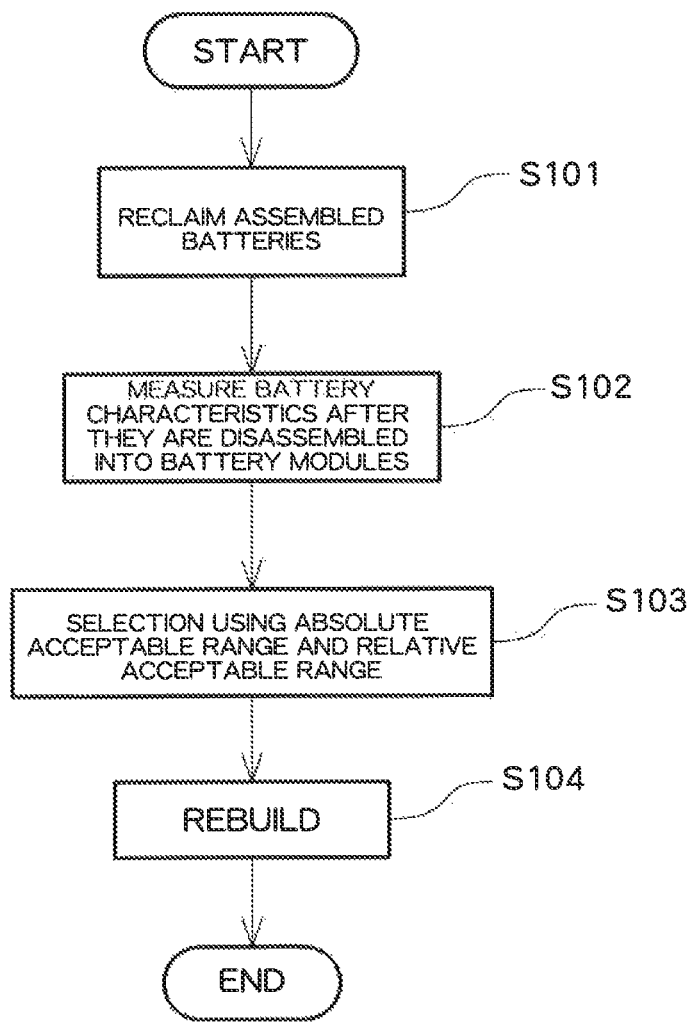
FIG. 2 is a processing flowchart according to an embodiment of the present invention.

FIG. 2 shows a flowchart of a rebuilding process according to an embodiment of the present invention. First, assembled batteries are reclaimed (S101). Specifically, when an electric vehicle or a hybrid electric vehicle is discarded, an assembled battery mounted in this vehicle is reclaimed. In other cases, when, because of a malfunction of battery modules constituting an assembled battery, the assembled battery is replaced with a new assembled battery, the old assembled battery is reclaimed. In the process of reclaiming assembled batteries, an end-of-life determination of an assembled battery is made, and the end-of-life determination may be performed by any method. For example, when variations in remaining capacity among battery modules are greater than or equal to a specified value, it is determined that the remaining life is short. An internal resistance for each battery module may be calculated to determine that the remaining life is short when the calculated internal resistance is greater than or equal to a specified value.

Next, assembled batteries which have been reclaimed are disassembled into battery modules, and battery characteristics such as an OCV and the like for each battery module are measured (S102). The battery characteristics may be not only an OCV but also an internal resistance, a remaining capacity, a battery mass, a battery temperature, or the like. When disassembled into battery modules, an assembled battery can be disassembled using a dedicated tool, and it is preferable that it is disassembled in a state in which a predetermined pressure is applied from both ends of the assembled battery so that the assembled battery is compressed.

After an assembled battery is disassembled into battery modules and battery characteristics are measured, individual battery modules are selected using two acceptable ranges including the absolute acceptable range and the relative acceptable range (S103). The absolute acceptable range is an acceptable range based on a value of battery characteristics. It is determined whether or not an OCV of a battery module is within an acceptable range, or in other words, between a lower limit OCV and an upper limit OCV, and when it is between the lower limit OCV and the upper limit OCV, it is determined that the battery module falls within the absolute acceptable range. Further, the relative acceptable range is an acceptable range of variations for each assembled battery which has been reclaimed, and is individually set for each assembled battery. Specifically, the width of an acceptable range is fixed, and the median value is set for each assembled battery. For example, when it is assumed that OCVs of battery modules constituting a reclaimed assembled battery form approximately a normal distribution, by using, as the relative acceptable range, a range of between $\mu-2\sigma$ and $\mu+2\sigma$, where the average value of the OCVs of that assembled battery is represented by p and the standard deviation is represented by $\sigma$, it is determined whether or not the battery module falls within this range, and when it is within the range, it is determined that the battery module falls within the relative acceptable range. For a different reclaimed assembled battery, because the average value $\mu$ also differs, the lower limit value $\mu-2\sigma$ and the upper limit value $\mu+2\sigma$ of the acceptable range also differ. Then, only battery modules which have battery characteristics falling within the absolute acceptable range, and which fall within the relative acceptable range, are selected as battery modules to be used for rebuilding.

After battery modules are selected using the two acceptable ranges in the above-described manner, a new assembled battery is rebuilt using the selected battery modules (S104).

Figure 3:
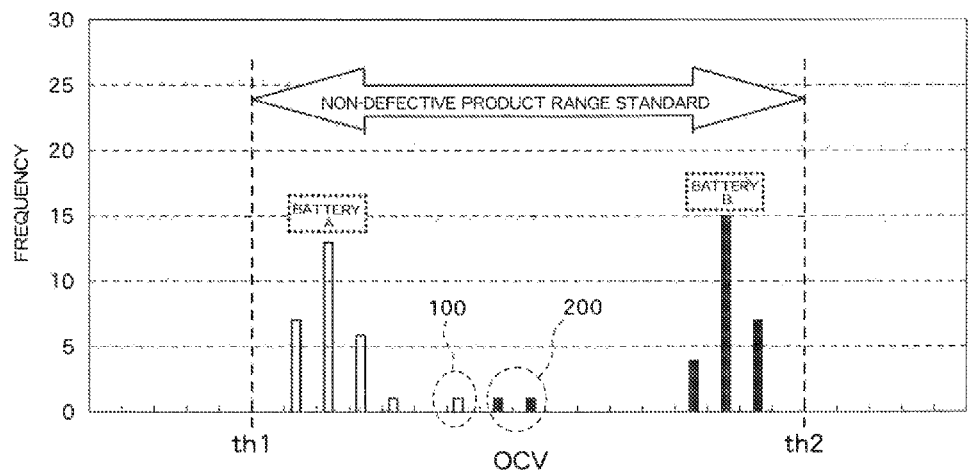
FIG. 3 is a schematic diagram showing an OCV distribution of reclaimed assembled batteries.

FIG. 3 shows an example of an OCV distribution of battery modules constituting reclaimed assembled batteries A and B. In the graphs, the horizontal axis represents the OCV (V), and the vertical axis represents the frequency (the number of battery modules). Although the battery modules constituting the assembled battery A and the battery modules constituting the assembled battery B are respectively manufactured in the same production lot, and therefore have approximately similar OCV values, among the battery modules constituting the assembled battery A, there is a battery module (in FIG. 3, represented by reference numeral 100) having an OCV value significantly deviated from those of the other battery modules, and also for the assembled battery B, there are battery modules (in FIG. 3, represented by reference numeral 200) having an OCV value significantly deviated from those of the other battery modules among the battery modules constituting the assembled battery B. When attention is focused only on OCV values, as the lower limit of OCV values of reusable products is th1 and the upper limit is th2, the battery modules represented by reference numerals 100 and 200 are included within a range defined by the lower limit th1 and the upper limit th2 (which is the absolute acceptable range, and, in FIG. 3, denoted as "non-defective product range standard"), but are unsuitable battery modules. Although it is not possible to eliminate the battery modules represented by reference numerals 100 and 200 if battery modules are selected using only the absolute acceptable range, the use of the relative acceptable range for each assembled battery makes it possible to reliably eliminate such battery modules.

Figure 4:
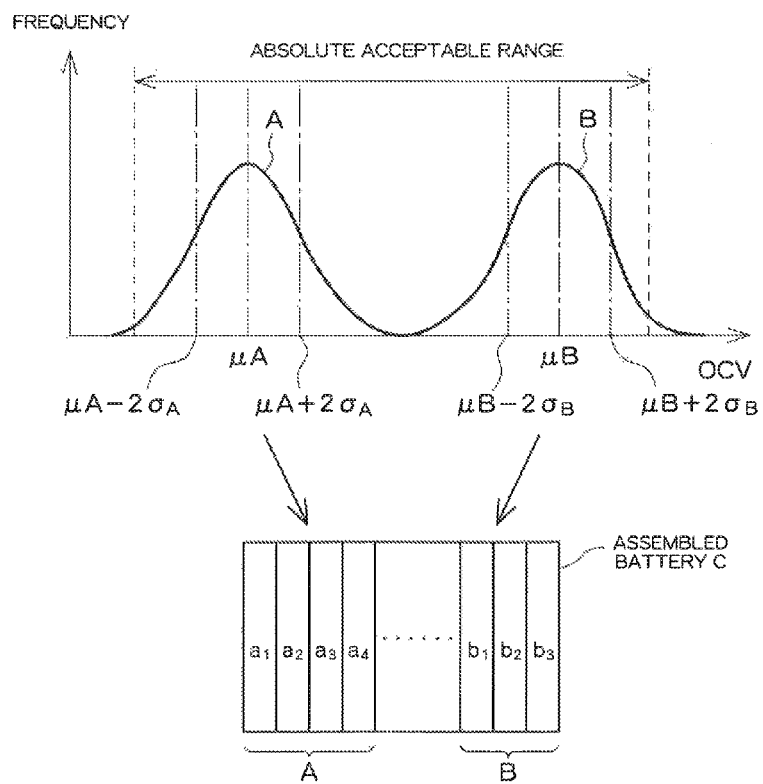
FIG. 4 is a schematic diagram showing an absolute acceptable range and a relative acceptable range.

FIG. 4 schematically shows a relationship between an absolute acceptable range and a relative acceptable range. In FIG. 4, distributions (histograms) of OCVs for the assembled batteries A and B are respectively represented by curves A and B. When it is assumed that the average value of the OCVs of the battery modules "a1" to "a20" constituting the assembled battery A is $\mu A$ and the standard deviation is $\sigma A$, the lower limit of the relative acceptable range set for the assembled battery A is $\mu A - 2\sigma A$ and the upper limit is $\mu A + 2\sigma A$. On the other hand, when it is assumed that the average value of the OCVs of the assembled battery B is $\mu B$ and the standard deviation is $\sigma B$, the lower limit of the relative acceptable range set for the assembled battery B is $\mu B - 2\sigma B$ and the upper limit is $\mu B + 2\sigma B$. Then, because battery modules falling outside the relative acceptable range set for each assembled battery are excluded, the battery module represented by reference numeral 100 is excluded as falling outside the relative acceptable range for the assembled battery A, and the battery modules represented by reference numeral 200 are excluded as falling outside the relative acceptable range for the assembled battery B. As described above, battery modules falling within the absolute acceptable range and falling within the relative acceptable range are selected from among the battery modules "a1" to "a20" constituting the assembled battery A, battery modules falling within the absolute acceptable range and falling within the relative acceptable range are selected from among the battery modules "b1" to "b20" constituting the assembled battery B, and a new assembled battery C is rebuilt using these selected battery modules.

Although an embodiment of the present invention has been described above, the present invention is not limited to this embodiment, and various modifications are possible.

For example, although, in the above-described embodiment, a case where a new assembled battery C is rebuilt from reclaimed assembled batteries A and B has been described, the number of reclaimed assembled batteries may also be more than two, and a new assembled battery C may be rebuilt from reclaimed assembled batteries A, B, and D.

Further, although in the above-described embodiment assembled batteries which were originally sold are reclaimed and battery modules are selected using the absolute acceptable range and the relative acceptable range for these reclaimed assembled batteries, when new assembled batteries are rebuilt using selected battery modules, and even when these assembled batteries constructed by rebuilding are again reclaimed and again used for rebuilding, battery modules may be selected using the absolute acceptable range and the relative acceptable range.

Figure 5:
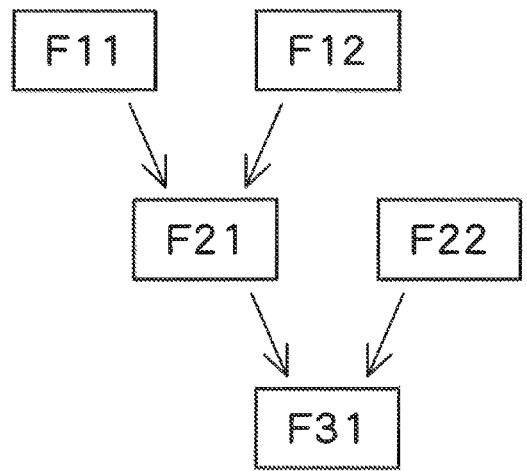
FIG. 5 is a schematic diagram showing first-generation, second-generation, and third-generation assembled batteries.

FIG. 5 shows a tree diagram of assembled batteries which are rebuilt. Assume that assembled batteries which were originally sold are first-generation F1, assembled batteries rebuilt from the first-generation assembled batteries are second-generation F2, and assembled batteries rebuilt from the second-generation assembled batteries are third-generation F3. When assembled batteries F11 and F12 of the first-generation F1 are reclaimed to rebuild an assembled battery F21 of the second-generation F2, an absolute acceptable range and a relative acceptable range are set for the assembled batteries F11 and F12 of the first-generation F1. Further, when assembled batteries F21 and F22 of the second-generation F2 are reclaimed to rebuild an assembled battery F31 of the third-generation F3, an absolute acceptable range and a relative acceptable range are set for the assembled batteries F21 and F22 of the second-generation. Although the absolute acceptable range is fixed irrespective of generation, the relative acceptable range is set for each generation.

Figure 6A:
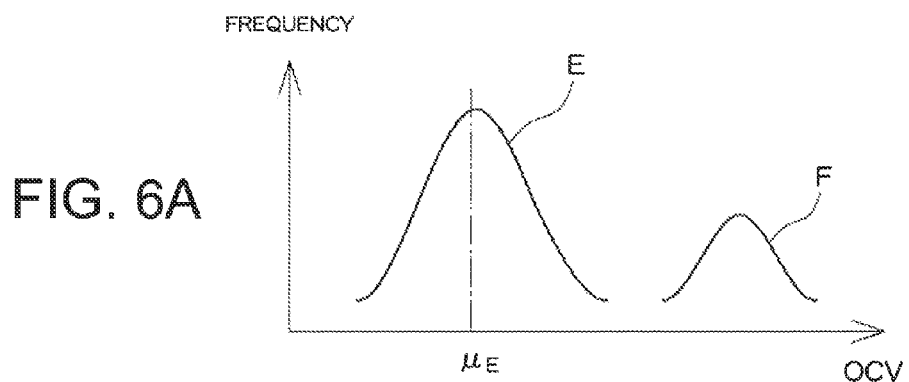
FIG. 6A is a schematic diagram showing an OCV distribution of a second-generation assembled battery.
Figure 6B:
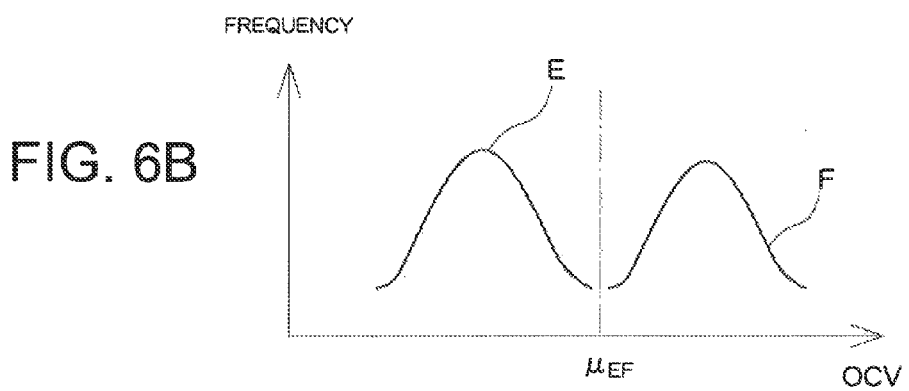
FIG. 6B is a schematic diagram showing an OCV distribution of a second-generation assembled battery.

FIGS. 6A and 6B show examples of OCV distributions of battery modules for cases where assembled batteries of the second-generation F2 are reclaimed. As the assembled batteries of the second-generation F2 are manufactured by rebuilding battery modules taken from a plurality of assembled batteries of the first-generation F1, the OCV distributions reflect usage histories of those assembled batteries of the first-generation F1. For example, a bimodal distribution including a distribution E and a distribution F occurs. FIG. 6A shows a case where a distribution E is relatively large when compared with a distribution F, and FIG. 6B shows a case where a distribution E and a distribution F are similar in magnitude. In the case shown in FIG. 6A, because the distribution E is sufficiently large when compared with the distribution F, battery modules constituting an assembled battery of the second-generation F2 are selected by separating the distribution E and the distribution F to calculate an average value $\mu E$ and a standard deviation $\sigma E$ only for the distribution E, and setting the lower limit value of a relative acceptable range to $\mu E - 2\sigma E$ and the upper limit value to $\mu E + 2\sigma E$, and the selected battery modules are used for rebuilding an assembled battery of the third-generation F3. For the case of FIG. 6A, it can be said that a relative acceptable range is set using an average value and a standard deviation of a dominant distribution which is one of a plurality of distributions. When an assembled battery of the second-generation is reconstructed from three assembled batteries of the first-generation, three distributions typically occur, and the above similarly applies to this case.

On the other hand, in the case shown in FIG. 6B, because the distribution E and the distribution F are similar in magnitude, battery modules constituting an assembled battery of the second-generation F2 are selected by collectively dealing with the distribution E and the distribution F to use an average value $\mu EF$ and a standard deviation $\sigma EF$ of the whole of the distribution E and the distribution F, and setting the lower limit value of a relative acceptable range to $\mu EF - 2\sigma EF$ and the upper limit value to $\mu EF + 2\sigma EF$, and the selected battery modules are used for rebuilding an assembled battery of the third-generation F3. Here, because the distribution as shown in FIG. 6B is not a normal distribution, instead of setting a relative acceptable range based on the standard deviation $\sigma EF$, it is also possible to set an appropriate value $\Delta$ to set the lower limit value to $\mu EF - \Delta$ and the upper limit value to $\mu EF + \Delta$. In this case, it is desirable to compare the appropriate value $\Delta$ with a predetermined reference value to determine which is greater, and when the value $\Delta$ is greater than the reference value, stopping the selection of battery modules determining that there are excessively large variations, to reinspect that assembled battery. When the value $\Delta$ is greater than the reference value even after a reinspection has been performed, battery modules constituting that assembled battery are excluded from what are to be used for rebuilding.

As described above, it is possible to set the absolute acceptable range and the relative acceptable range for a plurality of generations of assembled batteries.

Further, although, in the above-described embodiment, for the relative acceptable range, the lower limit value is set to $\mu - 2\sigma$ and the upper limit value is set to $\mu + 2\sigma$, the present invention is not necessarily limited to this example, and the lower limit value may be set to $\mu - \sigma$ or $\mu - 3\sigma$, and the upper limit value may be set to $\mu + \sigma$ or $\mu + 3\sigma$. Further, it is also possible to set the relative acceptable range by setting $\delta$ to a fixed value, and setting the lower limit value to $\mu - \delta$ and the upper limit value to $\mu + \delta$. In this case, although the relative acceptable range which is set for each assembled battery has the same width (2δ), only the median value μ will vary for each assembled battery.

4. Details of Rebuilding According to Another Embodiment

Figure 7:
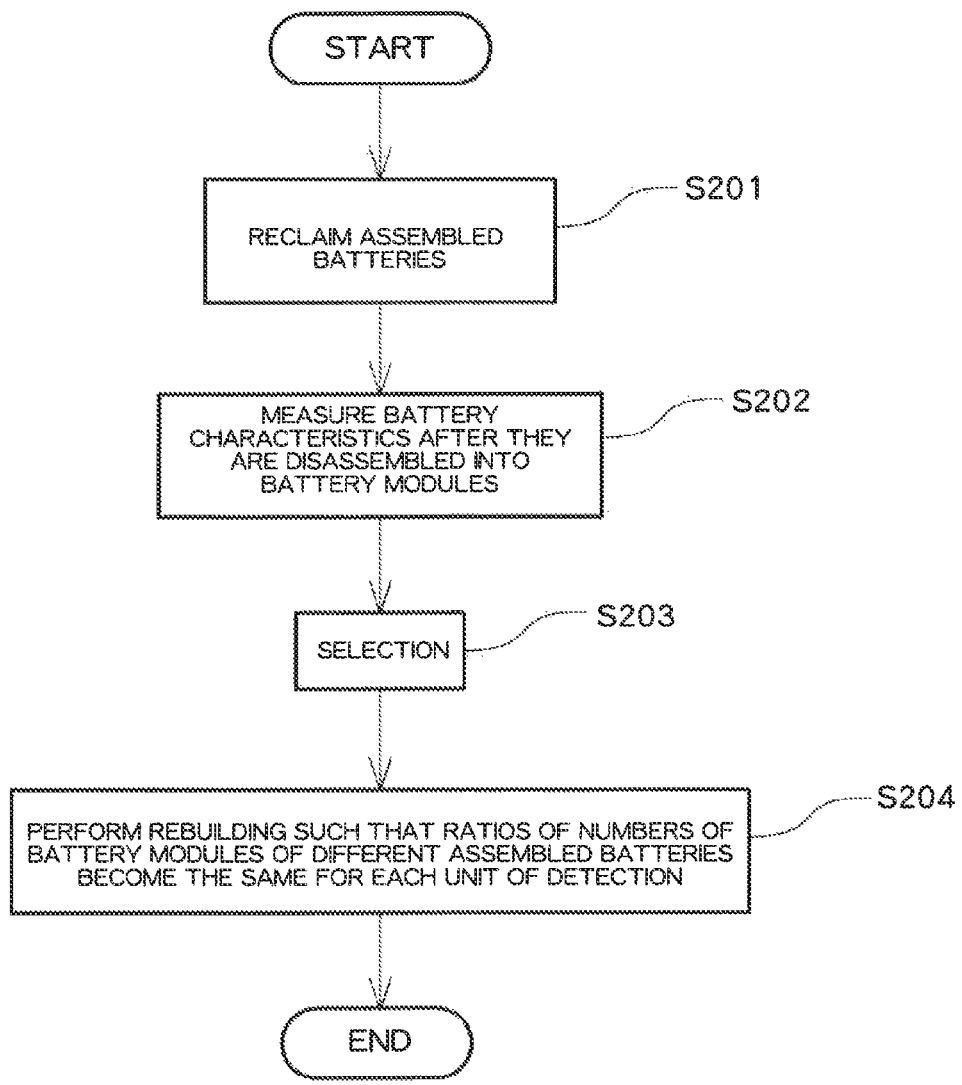
FIG. 7 is a processing flowchart according to another embodiment.

FIG. 7 shows a flowchart of a rebuilding process according to another embodiment of the present invention. First, assembled batteries are reclaimed (S201). Specifically, when an electric vehicle or a hybrid electric vehicle is discarded, an assembled battery mounted in this vehicle is reclaimed. In other cases, when, because of a malfunction of battery modules constituting an assembled battery, the assembled battery is replaced with a new assembled battery, the old assembled battery is reclaimed. In the process of reclaiming assembled batteries, an end-of-life determination of an assembled battery is made, and the end-of-life determination may be performed by any method. For example, when variations in voltage among battery blocks are greater than or equal to a specified value, it is determined that the remaining life is short. An internal resistance for each battery block may be calculated to determine that the remaining life is short when the calculated internal resistance is greater than or equal to a specified value.

Next, assembled batteries which have been reclaimed are disassembled into battery modules, and battery characteristics such as an OCV and the like for each battery module are measured (S202). The battery characteristics may be not only an OCV but also an internal resistance, a remaining capacity, a battery temperature or the like. When disassembled into battery modules, an assembled battery can be disassembled using a dedicated tool, and it is preferable that it is disassembled in a state in which a predetermined pressure is applied from both ends of the assembled battery so that the assembled battery is compressed.

After an assembled battery is disassembled into battery modules and battery characteristics are measured, reusable battery modules are selected (S203). For example, the selection may be performed using an absolute acceptable range and a relative acceptable range which have been described above. Also, other methods may be used, and, for example, it is determined whether or not an OCV of a battery module is within an acceptable range, or, in other words, between a lower limit OCV and an upper limit OCV, and when it is between the lower limit OCV and the upper limit OCV, it is determined that the battery module is reusable.

After battery modules are selected, a new assembled battery is rebuilt using the selected battery modules (S204). In the process of rebuilding, an assembled battery is rebuilt such that for each battery block which is a unit of detection for which a voltage, a remaining capacity, a temperature, and the like are detected for an assembled battery, the ratio of numbers of battery modules of different assembled batteries will be the same. Here, the phrase "battery modules of different assembled batteries" indicates that the assembled batteries which these battery modules have originally constituted are different from each other. For a battery block B1 constituting an assembled battery which has been rebuilt, when two battery modules constituting the battery block B1 are both disassembled from the same assembled battery A, the ratio of numbers for the battery block B1 is 100% for the assembled battery A, and when two battery modules constituting another battery block B2 are both disassembled from the same assembled battery B, the ratio of numbers for the battery block B2 is 0% for the assembled battery A (100% for the assembled battery B), and the ratios of numbers for the battery block B1 and the battery block B2 are not the same. On the other hand, when one of two battery modules of the battery block B1 is disassembled from the assembled battery A and the other is disassembled from the assembled battery B, the ratio of numbers for the battery block B1 is 50% for the assembled battery A (also 50% for the assembled battery B). Further, when one of two battery modules of the battery block B2 is disassembled from the assembled battery A and the other is disassembled from the assembled battery B, the ratio of numbers for the battery block B2 is 50% for the assembled battery A (also 50% for the assembled battery B), and is the same ratio as for the battery block B1. In the present embodiment, rebuilding is performed in such a manner that, for all battery blocks constituting a rebuilt assembled battery, the ratios of numbers of battery modules of different assembled batteries are adjusted to be the same. By performing rebuilding in this manner, when battery characteristics such as a voltage, a remaining capacity, a temperature and the like for a rebuilt assembled battery are detected for each battery block, because the ratios of numbers of battery modules of different assembled batteries are the same for every battery block, the behaviors of battery blocks are made uniform to eliminate variations in battery characteristics between battery blocks, and it is possible to effectively prevent situations in which, as in conventional cases, large variations between battery blocks cause an erroneous determination that there is an abnormality.

The meaning of "performing rebuilding in such a manner that the ratios of numbers of battery modules of different assembled batteries are adjusted to be the same" according to the present embodiment will be more specifically described below.

Figure 8:
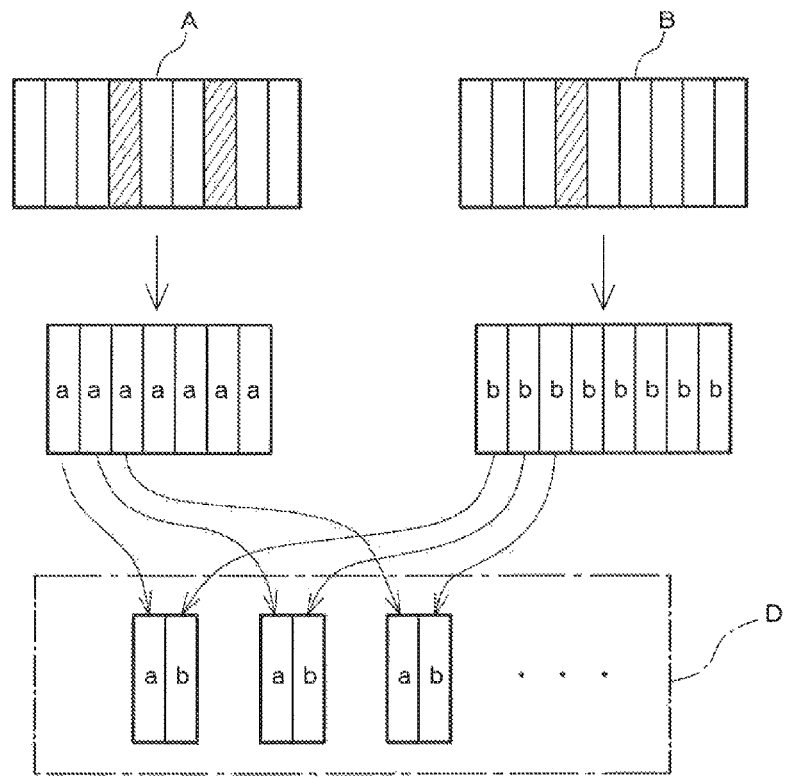
FIG. 8 is a schematic diagram showing a rebuilding method according to the embodiment shown in FIG. 7.

FIG. 8 shows a case where, when a battery block serving as a unit of detection in which battery characteristics of an assembled battery are detected is composed of two battery modules, a new assembled battery D is rebuilt from two reclaimed assembled batteries A and B.

The reclaimed assembled battery A may include a reusable battery module and a nonreusable battery module. In FIG. 8, diagonally shaded battery modules represent battery modules which are nonreusable due to some malfunction. First, the assembled battery A is reclaimed and disassembled into battery modules, and nonreusable battery modules are excluded. Reusable battery modules obtained by disassembling the assembled battery A are denoted as battery modules "a". Similarly, for the reclaimed assembled battery B, a nonreusable battery module (a diagonally shaded battery module) is excluded. Reusable battery modules obtained by disassembling the assembled battery B are denoted as battery modules "b".

Next, a new assembled battery D is rebuilt from a plurality of battery modules "a" and a plurality of battery modules "b". At this time, a battery block constituting the new assembled battery D is composed of one battery module "a" which has constituted the assembled battery A, and one battery module "b" which has constituted the assembled battery B. This similarly applies to other battery blocks, and all battery blocks are each composed of one battery module "a" and one battery module "b". By composing battery blocks as described above, all battery blocks constituting the assembled battery D are formed of a combination of a battery module "a" and a battery module "b", and even if the behaviors of battery characteristics of a battery module "a" and a battery module "b" differ, because a behavior in which those of a battery module "a" and a battery module "b" are combined will occur in units of battery blocks, the behaviors are made uniform for all battery blocks.

If it is assumed that a certain battery block constituting the assembled battery D is composed of two battery modules "a", the behavior of that battery block will differ from the behaviors of the other battery blocks. This similarly applies to a case where a battery block is composed of two battery modules "b".

Figure 9:
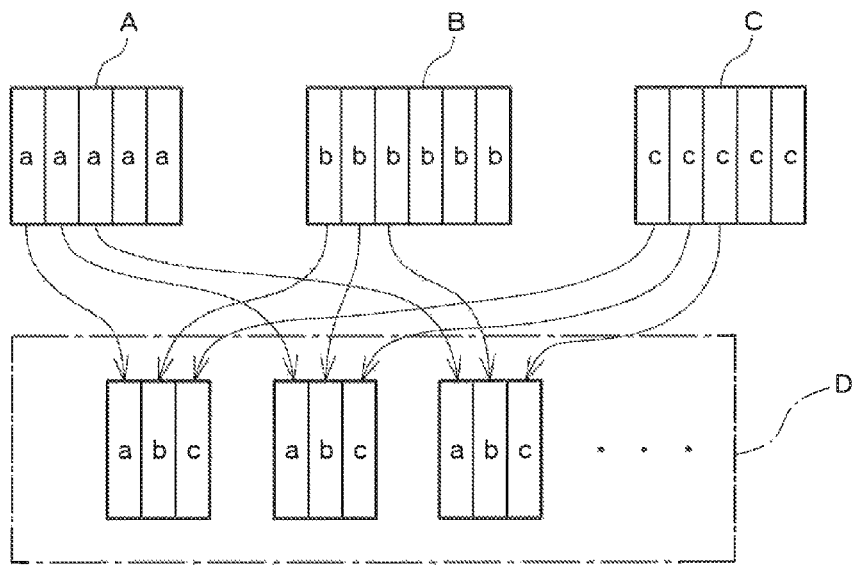
FIG. 9 is a schematic diagram showing a rebuilding method according to still another embodiment.

FIG. 9 shows a case where, when a battery block serving as a unit of detection in which battery characteristics of an assembled battery are detected is composed of three battery modules, a new assembled battery D is rebuilt from three reclaimed assembled batteries A, B, and C.

The reclaimed assembled battery A may include a reusable battery module and a nonreusable battery module. First, the assembled battery A is reclaimed and disassembled into battery modules, and nonreusable battery modules are excluded. Reusable battery modules obtained by disassembling the assembled battery A are denoted as battery modules "a". Similarly, for the reclaimed assembled batteries B and C, reusable battery modules obtained by disassembling the assembled batteries B and C are respectively denoted as battery modules "b" and "c".

Next, a new assembled battery D is rebuilt from a plurality of battery modules "a", a plurality of battery modules "b", and a plurality of battery modules "c". At this time, a battery block constituting the new assembled battery D is composed of one battery module "a" which has constituted the assembled battery A, one battery module "b" which has constituted the assembled battery B, and one battery module "c" which has constituted the assembled battery C. This similarly applies to other battery blocks, and all battery blocks are each composed of one battery module "a", one battery module "b", and one battery module "c". By composing battery blocks as described above, all battery blocks constituting the assembled battery D are formed of a combination of a battery module "a", a battery module "b", and a battery module "c", and even if the behaviors of battery characteristics of a battery module "a", a battery module "b", and a battery module "c" respectively differ, because a behavior in which those of a battery module "a", a battery module "b", and a battery module "c" are combined will occur in units of battery blocks, the behaviors are made uniform for all battery blocks.

It should be noted that when reclaimed assembled batteries are only two assembled batteries A and B, by composing all battery blocks each using one battery module "a" and two battery modules "b", the behaviors can be made uniform for all battery blocks with the ratio of the number of battery modules of the assembled battery A:the number of battery modules of the assembled battery B being 1:2. Alternatively, all battery blocks may also be each composed of two battery modules "a" and one battery module "b". In this case, the behaviors can also be made uniform for all battery blocks with the ratio of the number of battery modules of the assembled battery A:the number of battery modules of the assembled battery B being 2:1.

Further, also in cases where a battery block serving as a unit of detection in which battery characteristics of an assembled battery are detected is composed of four battery modules, several rebuilding methods are possible depending on the number of reclaimed assembled batteries.

First, when reclaimed assembled batteries are two assembled batteries A and B, a battery block may be composed using one battery module "a" and three battery modules "b" as four battery modules constituting the battery block. In this case, the behaviors can be made uniform for all battery blocks with the ratio of the number of battery modules of the assembled battery A:the number of battery modules of the assembled battery B being 1:3. Alternatively, a battery block may also be composed of two battery modules "a" and two battery modules "b". In this case, the behaviors can be made uniform for all battery blocks with the ratio of the number of battery modules of the assembled battery A:the number of battery modules of the assembled battery B being 2:2. Alternatively, a battery block may also be composed of three battery modules "a" and one battery module "b". In this case, the behaviors can be made uniform for all battery blocks with the ratio of the number of battery modules of the assembled battery A:the number of battery modules of the assembled battery B being 3:1.

Second, when reclaimed assembled batteries are three assembled batteries A, B, and C, a battery block may be composed using one battery module "a", one battery module "b", and two battery modules "c" as four battery modules constituting the battery block. In this case, the behaviors can be made uniform for all battery blocks with the ratio of the number of battery modules of the assembled battery A:the number of battery modules of the assembled battery B:the number of battery modules of the assembled battery C being 1:1:2. Similarly, the ratio of the number of battery modules of the assembled battery A:the number of battery modules of the assembled battery B:the number of battery modules of the assembled battery C may also be set to 1:2:1 or 2:1:1.

Third, when reclaimed assembled batteries are four assembled batteries A, B, C, and E, a battery block may be composed using one of each of battery modules "a", "b", "c", and "d" as battery modules constituting the battery block. In this case, the behaviors can be made uniform for all battery blocks with the ratio of the number of battery modules of the assembled battery A:the number of battery modules of the assembled battery B:the number of battery modules of the assembled battery C:the number of battery modules of the assembled battery E being 1:1:1:1.

5. Details of Rebuilding According to Still Another Embodiment

According to still another embodiment, battery modules of reclaimed assembled batteries are ranked (graded) in accordance with at least one of their battery characteristics such as OCVs, remaining capacities, internal resistances, battery masses, battery temperatures, and the like, and a new assembled battery is rebuilt using the battery modules which have been ranked.

The basic technical idea of this embodiment is that in consideration of the fact that when assembled batteries are disassembled into battery modules and the battery modules are ranked, although ranking battery modules into many different ranks enables an assembled battery to be rebuilt using battery modules having similar battery characteristics, it is disadvantageous in that there will be a large number of uncombinable battery modules and the efficiency of reuse will be reduced, attention is focused on the number of battery modules constituting a battery block serving as a unit of detection of an assembled battery when battery modules are ranked, and battery modules are ranked into ranks of a number corresponding to the number of battery modules constituting a battery block. In other words, when the number of battery modules constituting a battery block is two, battery modules obtained by disassembling assembled batteries are ranked into two ranks. Further, when the number of battery modules constituting a battery block is three, battery modules obtained by disassembling assembled batteries are ranked into three ranks. Then, by performing rebuilding in such a manner that the ratios of numbers of battery modules of different ranks are adjusted to be the same, battery characteristics such as a voltage, a remaining capacity, and the like for each battery block are equalized for a rebuilt assembled battery. As a result, situations in which large variations between battery blocks cause an erroneous determination that there is an abnormality are effectively prevented.

A rebuilding method according to the present embodiment will be specifically described below.

Figure 10:
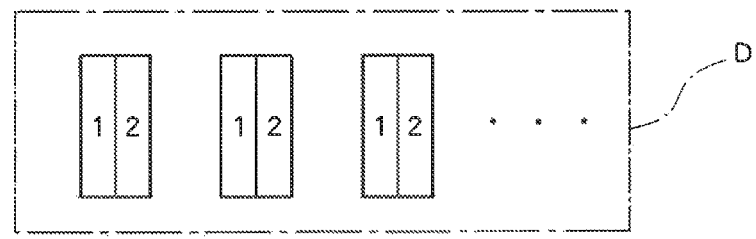
FIG. 10 is a schematic diagram showing a rebuilding method according to still another embodiment.

FIG. 10 shows a structure of an assembled battery D for a case where, when a battery block serving as a unit of detection in which battery characteristics of an assembled battery are detected is composed of two battery modules, a new assembled battery D is rebuilt from reclaimed assembled batteries. As the number of battery modules of a battery block constituting the assembled battery D is two, battery modules obtained by disassembling assembled batteries are ranked into either of two ranks using their battery characteristics. Assume that the two ranks are rank 1 and rank 2. For example, rank 1 refers to battery modules having an OCV greater than or equal to a predetermined value, and rank 2 refers to battery modules having an OCV less than the predetermined value. Further, assume that when the assembled battery D is rebuilt, one of two battery modules constituting a battery block is a battery module ranked as rank 1, and the other is a battery module ranked as rank 2. All battery blocks constituting the assembled battery D are each composed of a battery module ranked as rank 1 and a battery module ranked as rank 2. By composing battery blocks as described above, for battery blocks each serving as a unit of detection in which battery characteristics of the assembled battery D are detected, because all battery blocks are formed of a combination of a battery module ranked as rank 1 and a battery module ranked as rank 2, their battery characteristics are equalized. Further, because a combination of a battery module ranked as rank 1 and a battery module ranked as rank 2 is used, battery modules ranked as rank 1 and rank 2 can both be efficiently reused.

Figure 11:
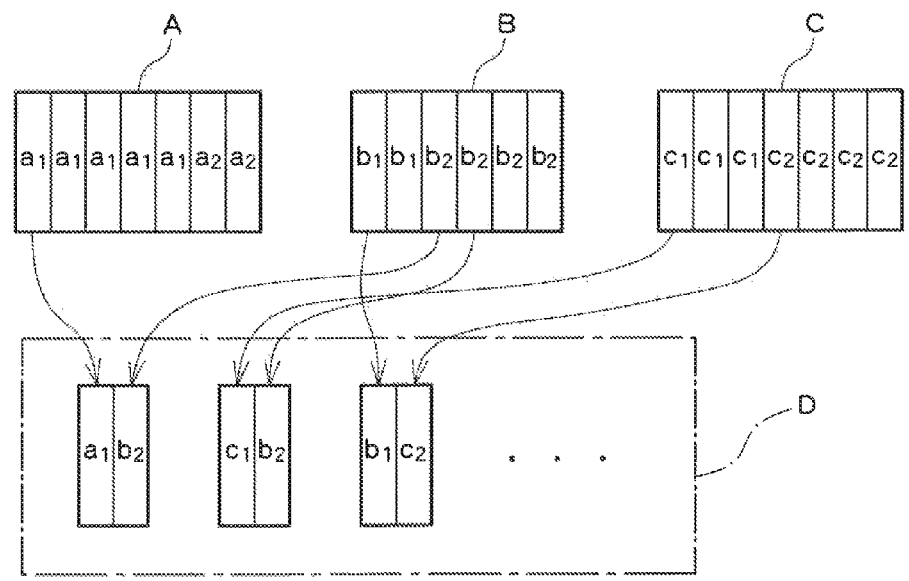
FIG. 11 is a schematic diagram showing a rebuilding method according to still another embodiment.

FIG. 11 shows a case where a new assembled battery D is rebuilt from three reclaimed assembled batteries A, B, and C.

The reclaimed assembled battery A may include a reusable battery module and a nonreusable battery module, and reusable battery modules are ranked into either rank 1 or rank 2. In FIG. 11, battery modules ranked as rank 1 are denoted as battery modules "a1", and battery modules ranked as rank 2 are denoted as battery modules "a2". Similarly, reusable battery modules of the reclaimed assembled batteries B and C are ranked into either rank 1 or rank 2, and battery modules ranked as rank 1 are denoted as battery modules "b1" and "c1", and battery modules ranked as rank 2 are denoted as "b2" and "c2".

Then, when the new assembled battery D is rebuilt, one battery module is taken from among a group of battery modules ranked as rank 1, and one battery module is further taken from among a group of battery modules ranked as rank 2 to compose a battery block for the assembled battery D. For example, a certain battery block is composed of a battery module "a1" ranked as rank 1 and a battery module "b2" ranked as rank 2, another battery block is composed of a battery module "c1" ranked as rank 1 and a battery module "b2" ranked as rank 2, and still another battery module is composed of a battery module "b1" ranked as rank 1 and a battery module "c2" ranked as rank 2. Because all battery blocks are each composed of a battery module ranked as rank 1 and a battery module ranked as rank 2, battery characteristics are equalized. In this case, which of the assembled battery A, B, or C the original assembled battery of a battery module ranked as rank 1 is, and which of the assembled battery A, B, or C the original assembled battery of a battery module ranked as rank 2 is, are not taken into consideration.

Figure 12:
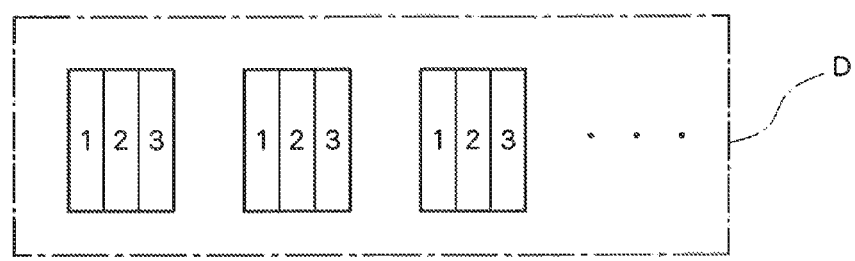
FIG. 12 is a schematic diagram showing a rebuilding method according to still another embodiment.

FIG. 12 shows a structure of an assembled battery D for a case where, when a battery block serving as a unit of detection in which battery characteristics of an assembled battery are detected is composed of three battery modules, a new assembled battery D is rebuilt from reclaimed assembled batteries. As the number of battery modules of a battery block constituting the assembled battery D is three, battery modules obtained by disassembling assembled batteries are ranked into either of three ranks using their battery characteristics. Assume that the three ranks are rank 1, rank 2, and rank 3. Further, assume that when the assembled battery D is rebuilt, one of three battery modules constituting a battery block is a battery module ranked as rank 1, another one is a battery module ranked as rank 2, and the remaining one is a battery module ranked as rank 3. All battery blocks constituting the assembled battery D are each composed of a battery module ranked as rank 1, a battery module ranked as rank 2, and a battery module ranked as rank 3. By composing battery blocks as described above, for battery blocks each serving as a unit of detection in which battery characteristics of the assembled battery D are detected, because all battery blocks are formed of a combination of a battery module ranked as rank 1, a battery module ranked as rank 2, and a battery module ranked as rank 3, their battery characteristics are equalized. Further, because a combination of a battery module ranked as rank 1, a battery module ranked as rank 2, and a battery module ranked as rank 3 is used, battery modules ranked as rank 1, rank 2, and rank 3 all can be efficiently reused.

As described above, by setting the number of battery modules constituting a battery block serving as a unit of detection of battery characteristics and the number of ranks into which battery modules are ranked to be the same, and composing each battery block using battery modules respectively ranked into different ranks, or, in other words, by adjusting the ratios of numbers of battery modules of different ranks to be the same for all battery blocks, it is possible to eliminate waste of battery modules while equalizing battery characteristics. According to the present embodiment, in order to adjust the ratios of numbers of battery modules of different ranks to be the same, for example, in the example of FIG. 12, cases such as a case where a certain battery block is composed of two battery modules ranked as rank 1 and one battery module ranked as rank 3 or a case where another battery block is composed of three battery modules ranked as rank 1 are excluded.

Also in the present embodiment, the original assembled batteries of battery modules constituting a battery block are basically different from each other. For example, in FIG. 11, battery modules constituting a certain battery block are a battery module "a1" and a battery module "b2", and as the original assembled battery of the battery module "a1" is the assembled battery A and the original assembled battery of the battery module "b2" is the assembled battery B, the assembled batteries are different from each other. Further, battery modules constituting another battery block are a battery module "c1" and a battery module "b2", and as the original assembled battery of the battery module "c1" is the assembled battery C and the original assembled battery of the battery module "b2" is the assembled battery B, the assembled batteries are different from each other.

On the other hand, when battery modules are ranked into, for example, rank 1 and rank 2, there may also be a case where all reusable battery modules of the assembled battery A are ranked into rank 1, all reusable battery modules of the assembled battery B are ranked into rank 2, and, for the assembled battery C, most reusable battery modules are ranked into rank 1 and a small number of battery modules are ranked into rank 2. In this case, battery modules for rank 1 may be all taken from battery modules of the assembled battery A, or may also be taken as desired from battery modules of the assembled battery A and the assembled battery C.

Further, battery modules for rank 2 may be taken from battery modules of the assembled battery B, or may also be taken from battery modules of the assembled battery C. As a result, there may also be a case where a battery module for rank 1 is taken from battery modules of the assembled battery C, and a battery module for rank 2 also is taken from battery modules of the same assembled battery C. In other words, two or more of battery modules constituting a battery block may be of the same original assembled battery.

Further, although, in the above-described embodiment, the number of battery modules constituting a battery block serving as a unit of detection of battery characteristics and the number of ranks into which battery modules are ranked are set to be the same, even if the numbers are different, it is sufficient if the ratios of numbers of battery modules of different ranks are adjusted to be the same for all battery blocks, and such an embodiment is also encompassed by the present invention. For example, when the number of battery modules constituting a battery block is three, it is also possible to rank battery modules into two ranks 1 and 2 to compose each battery block using two battery modules ranked as rank 1 and one battery module ranked as rank 2, or compose each battery block using one battery module ranked as rank 1 and two battery modules ranked as rank 2. As a result, battery characteristics for each battery block can be equalized. Further, when the number of battery modules constituting a battery block is two, and the number of ranks is five, ranks 1 to 5, it is also possible to select two from among ranks 1 to 5 (for example, ranks 2 and 5) to compose a rebuilt battery. In other words, the ratios of numbers of battery modules of different ranks are adjusted to be the same for all battery blocks using the selected two ranks. As a result, battery characteristics can be equalized between battery blocks.

What is claimed is:

1. A method for reusing a secondary battery by reconstructing an assembled battery from a plurality of used battery modules or unit cells, the method comprising:
   a measurement step of measuring battery characteristics of a plurality of used battery modules or unit cells obtained by disassembling a plurality of used assembled batteries;
   a selection step of selecting reusable battery modules based on the battery characteristics measured in the measurement step; and
   a reconstruction step of reconstructing an assembled battery using the battery modules selected in the selection step in such a manner that ratios of numbers of battery modules of the same original assembled batteries become the same for each battery block serving as a unit of detection in which battery characteristics of the newly reconstructed assembled battery are detected.

2. The method according to claim 1, wherein
   the battery block is composed of a number n of battery modules (n represents a natural number of 2 or greater);
   the number of the used assembled batteries is m (m represents a natural number of 2 or greater); and
   the reconstruction step comprises reconstructing each battery block of the newly reconstructed assembled battery by selecting one or a plurality of battery modules from among battery modules constituting each of the number m of the used assembled batteries, and combining the selected battery modules.

3. The method according to claim 2, wherein
   m=n; and
   the reconstruction step comprises reconstructing each battery block of the newly reconstructed assembled battery by selecting one battery module from among battery modules constituting each of the number n of the used assembled batteries, and combining the selected battery modules.

4. The method according to claim 3, wherein
   the battery block is composed of two battery modules;
   the used assembled batteries consist of a first assembled battery and a second assembled battery; and
   the reconstruction step comprises reconstructing each battery block of the newly reconstructed assembled battery by combining one of battery modules constituting the first assembled battery and one of battery modules constituting the second assembled battery.

5. The method according to claim 3, wherein
   the battery block is composed of three battery modules;
   the used assembled batteries consist of a first assembled battery, a second assembled battery, and a third assembled battery; and
   the reconstruction step comprises reconstructing each battery block of the newly reconstructed assembled battery by combining one of battery modules constituting the first assembled battery, one of battery modules constituting the second assembled battery, and one of battery modules constituting the third assembled battery.

6. A method for reusing a secondary battery by reconstructing an assembled battery from a plurality of used battery modules or unit cells, the method comprising:
   a measurement step of measuring battery characteristics of a plurality of used battery modules or unit cells obtained by disassembling a plurality of used assembled batteries;
   a selection step of selecting reusable battery modules based on the battery characteristics measured in the measurement step;
   a ranking step of ranking the battery modules selected in the selection step in accordance with the battery characteristics measured in the measurement step; and
   a reconstruction step of reconstructing an assembled battery using the battery modules ranked in the ranking step in such a manner that ratios of numbers of battery modules of the same ranks become the same for each battery block serving as a unit of detection in which battery characteristics of the newly reconstructed assembled battery are detected, wherein
   the battery block is composed of a number n of battery modules (n represents a natural number of 2 or greater);
   the ranking step comprises ranking the battery modules into a number n of ranks;
   the reconstruction step comprises reconstructing each battery block of the newly reconstructed assembled battery by selecting one battery module from among battery modules belonging to each of the number n of ranks, and combining the selected battery modules; and
   the number n of battery modules constituting the battery block are respectively of original assembled batteries that are different from each other.

* * * * *